US010725523B2

(12) United States Patent
Clark et al.

(10) Patent No.: US 10,725,523 B2
(45) Date of Patent: Jul. 28, 2020

(54) WAKING COMPUTING DEVICES BASED ON AMBIENT NOISE

(71) Applicant: Hewlett-Packard Development Company, L.P., Houston, TX (US)

(72) Inventors: Alexander Wayne Clark, Houston, TX (US); Kent E Biggs, Houston, TX (US); Richard E Hodges, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 73 days.

(21) Appl. No.: 16/074,078

(22) PCT Filed: Apr. 11, 2016

(86) PCT No.: PCT/US2016/026878
§ 371 (c)(1),
(2) Date: Jul. 30, 2018

(87) PCT Pub. No.: WO2017/180087
PCT Pub. Date: Oct. 19, 2017

(65) Prior Publication Data
US 2019/0041958 A1 Feb. 7, 2019

(51) Int. Cl.
*G06F 1/3231* (2019.01)
*G06F 1/32* (2019.01)
(Continued)

(52) U.S. Cl.
CPC .............. *G06F 1/3231* (2013.01); *G06F 1/32* (2013.01); *G06F 1/3206* (2013.01); *G06F 1/3246* (2013.01); *Y02D 10/173* (2018.01)

(58) Field of Classification Search
CPC ........ G06F 1/3231; G06F 1/32; G06F 1/3206; G06F 1/3246; Y02D 10/173
See application file for complete search history.

(56) References Cited

U.S. PATENT DOCUMENTS 5,983,186 A * 11/1999 Miyazawa .............. G10L 15/26
704/233
6,408,396 B1 6/2002 Forbes
(Continued)

FOREIGN PATENT DOCUMENTS

| CN | 105261368 | 1/2016 |
|---|---|---|
| JP | 2005148301 | 6/2005 |

(Continued)

OTHER PUBLICATIONS

Webpage ~ "Wake Up Android Phone with Certain Words Like Hi Galaxy or Ok Google" ~ http://stackoverflow.com ~ Feb. 4, 2016 ~ 2 pages.

*Primary Examiner* — Nimesh G Patel
(74) *Attorney, Agent, or Firm* — HP Inc. Patent Department

(57) ABSTRACT

Examples disclosed herein provide the ability for a computing device to determine a noise threshold to wake on ambient noises. In one example method, the computing device tracks sound, detected by a microphone of the computing device, over a period of time and, based on the sound tracked over the period of time, determines a noise threshold. The computing device tunes a sensitivity of the microphone to wake the computing device when ambient noise, detected by the microphone, is to have a signal strength equal to or exceeding the noise threshold.

13 Claims, 3 Drawing Sheets

(51) Int. Cl.
*G06F 1/3206* (2019.01)
*G06F 1/3246* (2019.01)

(56) References Cited

U.S. PATENT DOCUMENTS

| | | | |
|---|---|---|---|
| 2011/0310419 A1* | 12/2011 | Yoshie | B41J 11/0095 |
| | | | 358/1.13 |
| 2012/0124399 A1 | 5/2012 | Liao | |
| 2013/0080811 A1 | 3/2013 | Low et al. | |
| 2014/0006825 A1 | 1/2014 | Shenhav | |
| 2014/0204044 A1 | 7/2014 | Mak-Fan et al. | |
| 2014/0358552 A1 | 12/2014 | Xu | |
| 2014/0379305 A1 | 12/2014 | Kumar | |
| 2015/0066498 A1 | 3/2015 | Ma et al. | |
| 2015/0340042 A1 | 11/2015 | Sejnoha et al. | |
| 2015/0365750 A1 | 12/2015 | Sun et al. | |
| 2016/0116960 A1* | 4/2016 | Kwak | G06F 1/3206 |
| | | | 713/323 |
| 2016/0163169 A1* | 6/2016 | Gerdes | G08B 13/1672 |
| | | | 340/566 |

FOREIGN PATENT DOCUMENTS

| | | |
|---|---|---|
| JP | 2014041464 | 3/2014 |
| WO | WO-2015149216 A1 | 10/2015 |

\* cited by examiner

WAKING COMPUTING DEVICES BASED ON AMBIENT NOISE

BACKGROUND

Sleep mode is a low power mode for electronic devices such as computing devices, televisions, and remote controlled devices. The sleep mode saves significantly on electrical consumption compared to leaving an electronic device fully on and, upon resume, allows the user to avoid having to reissue instructions or to wait for the electronic device to reboot.

DETAILED DESCRIPTION

In computing devices, entering a sleep state is roughly equivalent to "pausing" the state of the machine. When restored, the operation continues from the same point, having the same applications and files open. Machine state is held in RAM and, when placed in sleep mode, the computing device cuts power to unneeded subsystems and places the RAM into a minimum power state, just sufficient to retain its data. A computing device must consume some energy while sleeping in order to power the RAM and to be able to respond to a wake-up event. Examples of wake-up events include the press of the power button or other physical interaction with the computing device, such as from peripherals including a keyboard and/or mouse.

Examples disclosed herein provide the ability for a computing device to record and track noise patterns over a course of time, in order to determine long-term calibration settings for the computing device configured to wake on ambient noises, prior to any physical interaction with the computing device. As a result, the computing device may be ready for use when a user likely intends to use the computing device, rather than waiting for the user to physically wake the computing device via a physical interaction with the computing device.

As an example, the calibration settings identify pivotal areas of the day to tune sensitivity of a microphone of the computing device in order to maximize time that the computing device is in sleep mode. The calibration settings are optimized in order to ensure that the computing device is sleeping and saving power as much as possible while being sensitive enough to wake up when the average user triggers the computing device by producing noise at or above a certain threshold. As an example, the computing device may allow for automatic recalibration of this noise threshold, allowing the computing device to tune itself as it learns more about its surroundings and environment changes.

Figure 1:
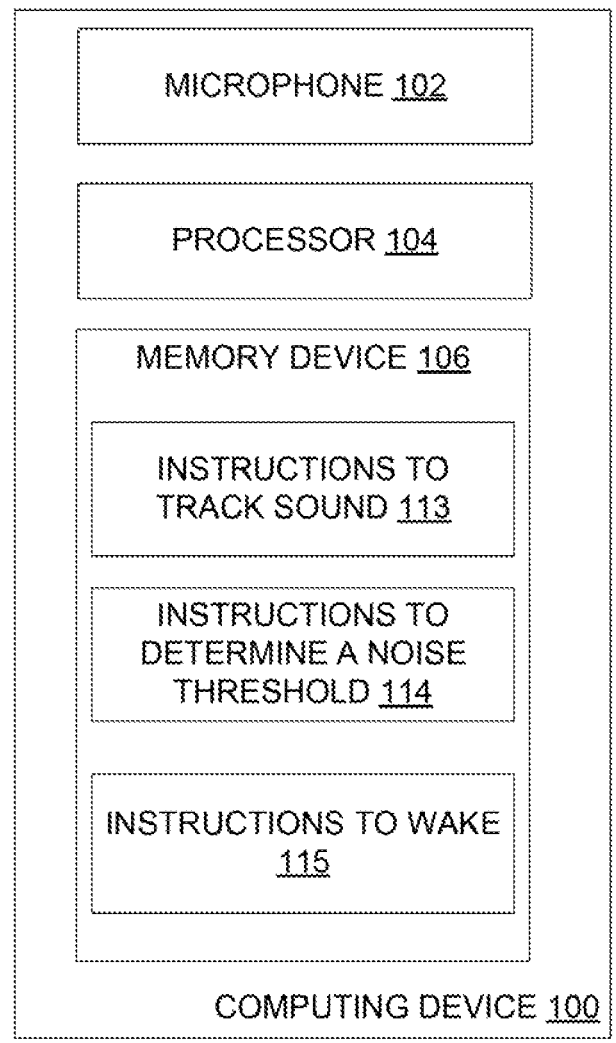
FIG. 1 illustrates a computing device for determining a noise threshold to wake on ambient noises, according to an example.

With reference to the figures, FIG. 1 illustrates a computing device 100 for determining a noise threshold to wake on ambient noises, according to an example. The computing device 100 includes a microphone 102 for detecting sound in proximity of the computing device 100, and is used for determining the noise threshold, as will be further described. As the microphone 102 may be configured to wake the computing device 100 at any noise level at or above a certain threshold, then that threshold has to be determined. Although the noise threshold may be preset, for example, by the factory or a user itself, if too low of a noise threshold is set, then the computing device 100 may never go to sleep. As an example, if the computing device 100 is in a conference room, noises such as people moving around outside the conference room, a noisy air conditioner, or loud speakers in an adjacent room may constantly keep the computing device 100 awake. Similarly, if the noise threshold is set too high, then the computing device 100 may stay asleep for an undesirable amount of time. As an example, users will enter the conference room with the intent to start their meeting, and get frustrated that the device is not automatically turned on and awake. As will be further described, the computing device 100 may calibrate itself over a set period of time, and then intelligently set the noise threshold depending on the time of day and the calibration settings.

The computing device 100 depicts a processor 104 and a memory device 106 and, as an example of the computing device 100 performing its operations, the memory device 106 may include instructions 113-115 that are executable by the processor 104. Thus, memory device 106 can be said to store program instructions that, when executed by processor 104, implement the components of the computing device 100.

In FIG. 1, the executable program instructions stored in the memory device 106 include instructions to track sound 113, instructions to determine a sound threshold 114, and instructions to wake 115. Instructions to track sound 113 represent program instructions that when executed by the processor 104 cause the computing device 100 to track sound, as detected by the microphone 102, over a period of time (e.g., a week), in order to determine the calibration settings described above. As an example, when the computing device 100 goes through an initial calibration, or a recalibration, as will be further described below, the computing device 100 may remain awake and not enter sleep mode at any time during the calibration process. The length of the calibration process may vary (e.g., a week). During this time, the computing device 100 remains on and records all noise levels over the set period of time.

Instructions to determine a noise threshold 114 represent program instructions that when executed by the processor 104 cause the computing device 100 to determine a noise threshold, based on the sound tracked over the period of time. As an example, the noise threshold correlates to when the computing device 100 may be in use. As an example, an average noise level or threshold may be gathered. This average is a mean noise level for the sound collected over the period of time, excluding any spurious, one-time noises that are filtered out using any number of outlier detection or audio filtering techniques. While the average noise level may be an overall noise decibel, there is also the possibility of noting more advanced noise thresholds, such as the highs, lows, and mid tones of the noise. As an example, noise thresholds may take frequency ranges into consideration, accounting for frequency ranges more closely associated with humans, and filtering out other frequency ranges, for example, associated with machinery such as air conditioning. As an example, the noise threshold may correspond to a particular frequency range at or above a certain noise level (e.g., dB).

As an example, the noise threshold may vary based on a time of day. For example, if the computing device 100 is in a conference room, the noise threshold for waking the computing device 100 after working hours will be higher than that of the noise threshold during the workday. With regards to after-work hours, this time segment marks the period of time in which the computing device 100 is most likely not in use, typically at night and before or after work hours. The behavior of the computing device 100 can be configured to raise the noise threshold at night, ensuring that the computing device 100 has a greater chance of sleeping when it is most likely not going to be in use.

Continuing the example above, when determining the noise threshold during working hours, or when the computing device 100 is typically used, various factors may be taken into consideration, in order to ensure that the computing device 100 is sleeping and saving power as much as possible while being sensitive enough to wake up when the average user triggers the computing device 100 by producing noise at or above a certain threshold. As an example, different noise levels may be detected during work hours when the computing device 100 is unused, prior to device usage, and while the computing device 100 is in use. These various noise levels may be used to determine the average noise threshold for waking the computing device 100 during working hours.

During the calibration process described above, the noise levels recorded whenever the computing device 100 is not in use (e.g., no mouse clicks, keyboard presses, or presentations running) determine the average noise threshold for work hours. The noise threshold for waking the device will need to be above this data point. With regards to the brief period of time preceding device usage (e.g., five minutes prior to any physical interaction with the computing device 100), the goal of this time segment is to get an average noise threshold in the room right before the computing device 100 is used. A practical implication of this would be to analyze the five minutes of sounds recorded before the user clicks a button, moves a mouse, or presses the keyboard. The computing device 100, via the microphone 102, can then get an estimate on how much noise a user will generate before they start their meeting or use the computing device 100. The noise threshold for waking the computing device 100 will need to be just slightly below this data point. Finally, while the computing device 100 is in use during working hours, the microphone 102 may record the sound levels of people meeting in the room to ensure that the computing device 100 does not unnecessarily go to sleep while people are still in the room and using the computing device 100. The noise threshold for waking the device needs to be below the average noise level of this time segment.

Instructions to wake 115 represent program instructions that when executed by the processor 104 cause the computing device 100 to tune a sensitivity of the microphone 102 to wake the computing device 100 when ambient noise, detected by the microphone 102, is to have a signal strength equal to or exceeding the noise threshold that is determined, as described above. As an example, the noise threshold varies based on a time of day, as also described above. Continuing with the example above, as the computing device 100 may be in a conference room, the computing device 100 may have access to scheduling information for the conference room. As a result, if a meeting is scheduled for a particular time, the noise threshold may be adjusted (e.g., lowered), in order for the microphone 102 to be more sensitive to ambient noise in order to wake the computing device 100 when the ambient noise is at or above the adjusted noise threshold.

As an example, once the computing device 100 exits sleep mode, upon detecting ambient noise equal to or exceeding the noise threshold, the computing device 100 may remain awake while ambient noise continues to equal or exceed the noise threshold, as this level of ambient noise is likely indicative of a proximity of users to the computing device 100, likely using the computing device 100. However, once the level of ambient noise remains below the noise threshold for a period of time, as may be specified, the computing device 100 may then reenter sleep mode. This may allow the computing device 100 to save power, when it is likely that the computing device 100 is no longer being used.

There are certain actions during the ongoing use of the computing device 100 that can automatically indicate that the device noise threshold is inaccurate or needs adjusting. For instance, the biggest indication of a faulty calibration is keyboard or mouse movement causing the computing device 100 to exit from sleep mode before the noise threshold does. If a user is moving the mouse, hitting a button, or pressing the keyboard before the computing device 100 registered their noise as being above the noise threshold, then the computing device 100 may record this as an undesired event. The first several noted undesired events may invoke no action though. This is to bypass abnormally quiet users that are not representative of the average noise threshold needed to wake the computing device 100. Similarly, if the computing device 100 exits sleep mode upon detecting ambient noise equal to or exceeding the noise threshold, but then detects no user interaction (e.g., physical interaction via peripherals), the computing device 100 may record this as an undesired event as well. If a number of such undesired events occur, where no subsequent user interaction is detected, the noise threshold may be too sensitive, preventing power savings.

After several instances of a user manually waking the system, rather than letting the noise threshold do it, the computing device 100 may need to adjust the noise threshold. As an example, this may be a marginal lowering of the noise threshold to make it slightly more sensitive. The computing device 100 may record the event of lowering the threshold. Similarly, after several instances of the computing device 100 exiting sleep mode and detecting no subsequent user interaction, the noise threshold may be adjusted by marginally increasing it to make it less sensitive.

Finally, if several events of having to marginally move the noise threshold are recorded, then the computing device may determine that a full recalibration is needed. As an example, this could be from either the computing device 100 being moved into a different environment, or the environment around the computing device 100 changing (such as rooms or halls being used more frequently). In this case, the device automatically identifies a full recalibration is needed and restarts the initial calibration as described above, that records and tracks the noise levels over a period of time.

Memory device 106 represents generally any number of memory components capable of storing instructions that can be executed by processor 104. Memory device 106 is non-transitory in the sense that it does not encompass a transitory signal but instead is made up of at least one memory component configured to store the relevant instructions. As a result, the memory device 106 may be a non-transitory computer-readable storage medium. Memory device 106 may be implemented in a single device or distributed across devices. Likewise, processor 104 represents any number of processors capable of executing instructions stored by memory device 106. Processor 104 may be integrated in a single device or distributed across devices.

Further, memory device 106 may be fully or partially integrated in the same device as processor 104, or it may be separate but accessible to that device and processor 104.

In one example, the program instructions 113-115 can be part of an installation package that when installed can be executed by processor 104 to implement the components of the computing device 100. In this case, memory device 106 may be a portable medium such as a CD, DVD, or flash drive or a memory maintained by a server from which the installation package can be downloaded and installed. In another example, the program instructions may be part of an application or applications already installed. Here, memory device 106 can include integrated memory such as a hard drive, solid state drive, or the like.

Figure 2:
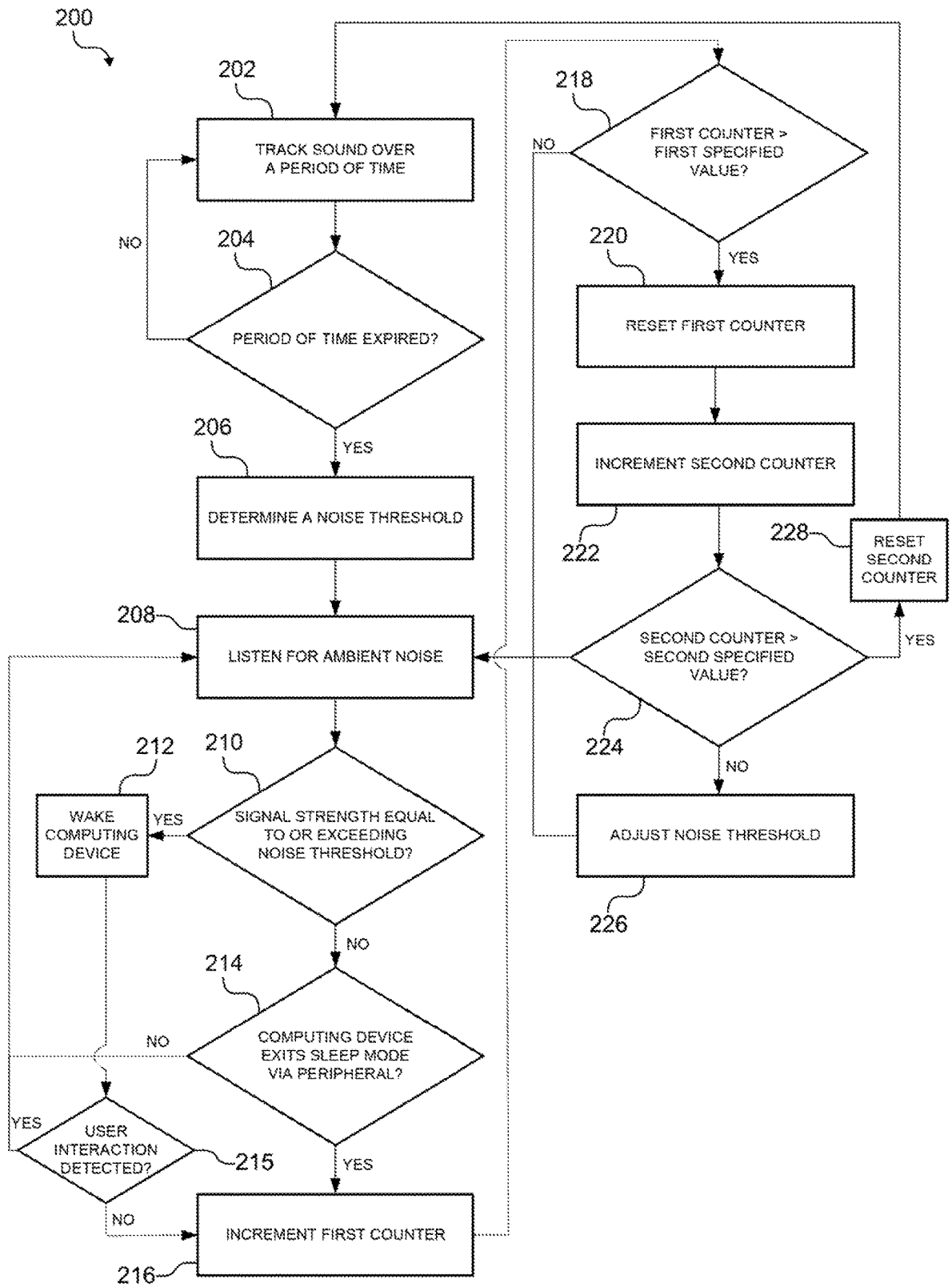
FIG. 2 illustrates a method of operation at the computing device to determine a noise threshold to wake the computing device based on ambient noises, according to an example.

FIG. 2 illustrates a method 200 of operation at a computing device to determine a noise threshold to wake the computing device based on ambient noises, according to an example. As an example, method 200 is described with reference to computing device 100. At 202, the computing device 100 tracks sound, as detected by the microphone 102, over a period of time (e.g., a week). As an example, the computing device 100 remains awake over the period of time, and records all noise levels over the set period of time.

At 204, upon determining whether the period of time has expired, the computing device 100 determines a noise threshold, at 206, based on the sound tracked over the period of time. As an example, the noise threshold correlates to when the computing device 100 may be in use, for example, by a user or in a presentation. As an example, an average noise level or threshold may be gathered, as described above. As an example, the noise threshold may correspond to a particular frequency range at or above a certain noise level (e.g., dB). In addition, the noise threshold may vary based on a time of day, as described above. Upon determining the noise threshold, the computing device 100 may enter a sleep mode, until the microphone 102 detects ambient noise having a signal strength equal to or exceeding the noise threshold.

At 208, the microphone 102 listens for ambient noise and, at 210, upon determining that the ambient noise has a signal strength equal to or exceeding the noise threshold, the computing device wakes up, or exits sleep mode, at 212. With the ambient noise equal to or exceeding the noise threshold, it is likely that a user is about to use the computing device 100, based on the noise threshold determined, as described above. As a result, the computing device 100 automatically exits sleep mode and is made available for the user, without requiring any physical interaction from the user (e.g., keyboard press or mouse movement).

At 214, if the computing device 100 exits sleep mode via a peripheral instead, a first counter is incremented, at 216. As an example, the first counter corresponds to the undesired events described above. There are certain actions during the ongoing use of the computing device 100 that can automatically indicate that the device noise threshold is inaccurate or needs adjusting. For instance, the biggest indication of a faulty calibration is keyboard or mouse movement causing the computing device 100 to exit from sleep mode before the noise threshold does. If a user is moving the mouse, hitting a button, or pressing the keyboard before the computing device 100 registered their noise as being above the noise threshold, then the computing device 100 may record this as an undesired event. The first several noted undesired events may invoke no action though. This is to bypass abnormally quiet users that are not representative of the average noise threshold needed to wake the computing device 100. Similarly, at 215, if the computing device 100 exits sleep mode upon detecting ambient noise equal to or exceeding the noise threshold, but then detects no user interaction (e.g., physical interaction via peripherals), the computing device 100 may record this as an undesired event as well (i.e., increment first counter at 216). If a number of such undesired events occur, where no subsequent user interaction is detected, the noise threshold may be too sensitive, preventing power savings.

At 218, after the first counter is greater than a first specified value, the computing device 100 may need to adjust the noise threshold. As an example, this may be a marginal lowering of the noise threshold to make it slightly more sensitive. However, prior to adjusting the noise threshold, at 220, the first counter is reset and, at 222, a second counter is incremented. The second counter corresponds to the number of times that the noise threshold was adjusted by the computing device 100, when the computing device 100 continues to exit sleep mode via the use of peripherals instead of based on ambient noise, as described above. At 224, if the second counter is greater than a second specified value, the second counter is reset, at 228, and a recalibration is performed, as described above. However, at 224, if the second counter is less than or equal to the second specified value, the noise threshold is adjusted, at 226, and the computing device 100 returns to listening for ambient noise, at 208. During this time, the computing device 100 may resume sleep mode, and leave the microphone 102 powered on to listen for ambient noise.

Figure 3:
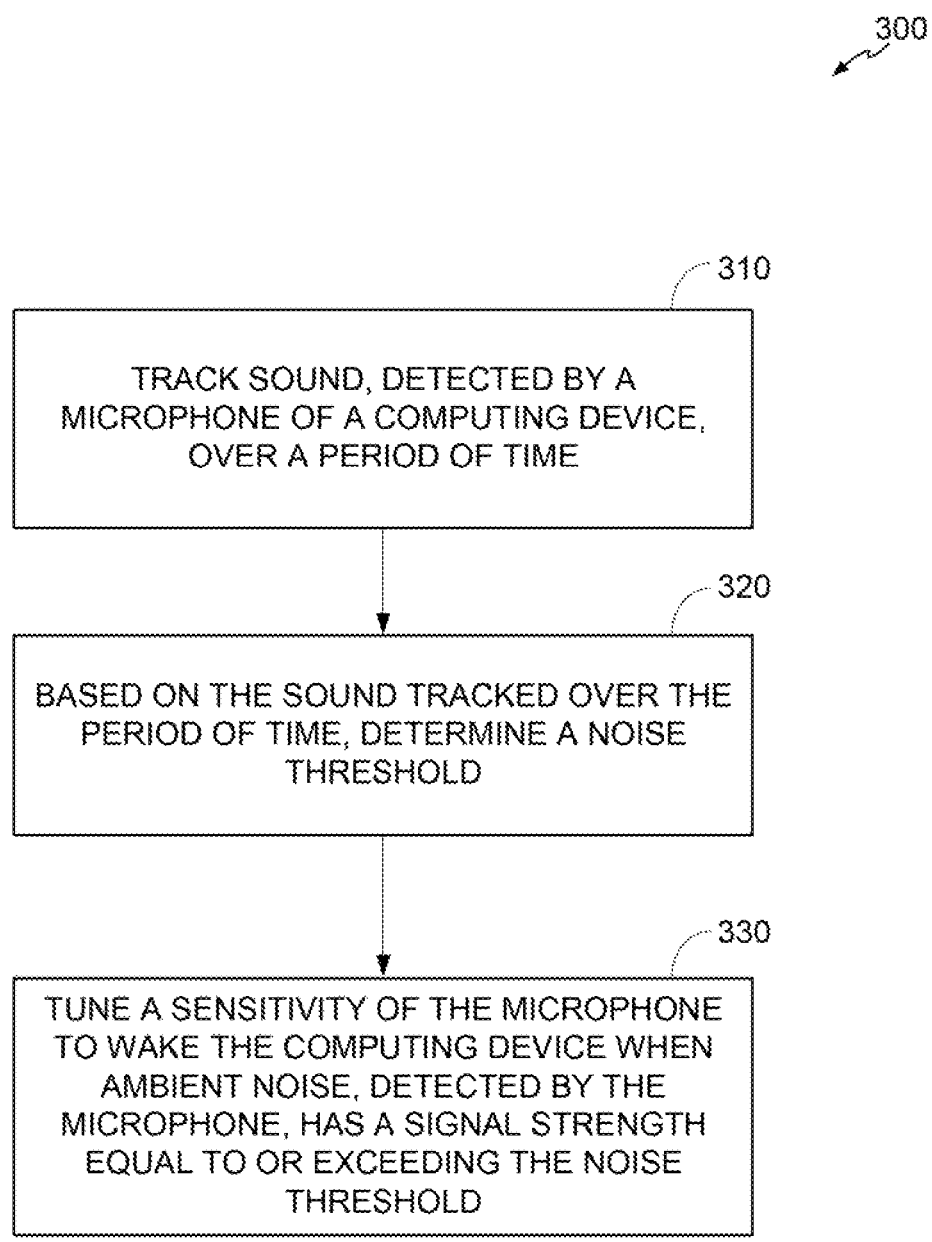
FIG. 3 is a flow diagram in accordance with an example of the present disclosure.

FIG. 3 is a flow diagram 300 of steps taken to implement a method for determining a noise threshold to wake a computing device based on ambient noises, according to an example. In discussing FIG. 3, reference may be made to the example computing device 100 illustrated in FIG. 1. Such reference is made to provide contextual examples and not to limit the manner in which the method depicted by FIG. 3 may be implemented.

At 310, the computing device may track sound, detected by a microphone of the computing device, over a period of time. As an example, when the computing device goes through an initial calibration, or a recalibration, as described above, the computing device may remain awake and not enter sleep mode at any time during the calibration process. The length of the calibration process may vary (e.g., a week). During this time, the computing device may remain on and record all noise levels over the set period of time.

At 320, based on the sound tracked over the period of time, the computing device may determine a noise threshold that correlates to when the computing device may be in use. As an example, the noise threshold varies based on a time of day. In addition, the noise threshold may be an average noise level of the sound tracked over the period of time corresponding to a time segment of the time of day (e.g., during or after working hours). The noise threshold may be lower during working hours. As an example, the noise threshold for a time segment of the time of day may include thresholds for highs, lows, and mid tones of the sound tracked over the period of time for the time segment of the time of day.

At 330, the computing device may tune a sensitivity of the microphone to wake the computing device when ambient noise, detected by the microphone, has a signal strength equal to or exceeding the noise threshold. As an example, the computing device may access scheduling information for a conference room where the computing device is being use, and adjust the noise threshold based on the scheduling information. For example, the noise threshold may be lowered if a meeting is scheduled.

Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples.

The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
    tracking sound, detected by a microphone of a computing device, over a period of time;
    based on the sound tracked over the period of time, determining a noise threshold;
    tuning a sensitivity of the microphone to wake the computing device when ambient noise, detected by the microphone, has a signal strength equal to or exceeding the noise threshold;
    recording events when the computing device exits a sleep mode via the use of peripherals rather than the microphone detecting ambient noise exceeding the noise threshold; and
    determining the noise threshold is inaccurate when a number of the events recorded exceeds a specified value.

2. The method of claim 1, wherein the noise threshold varies based on a time of day.

3. The method of claim 2, wherein the noise threshold is an average noise level of the sound tracked over the period of time corresponding to a time segment of the time of day.

4. The method of claim 2, wherein the noise threshold for a time segment of the time of day comprises thresholds for highs, lows, and mid tones of the sound tracked over the period of time for the time segment of the time of day.

5. The method of claim 1, comprising:
    accessing scheduling information for a conference room including the computing device; and
    adjusting the noise threshold based on the scheduling information.

6. The method of claim 5, wherein the noise threshold is lower during working hours.

7. The method of claim 1, wherein in response to the determination that the noise threshold is inaccurate, lowering the noise threshold to make the microphone more sensitive to wake the computing device when ambient noise equals or exceeds the lower noise threshold.

8. The method of claim 7, wherein after lowering the noise threshold several times, in response to a determination that the computing device continues to exit the sleep mode via the use of peripherals rather than the microphone detecting ambient noise, calibrating the computing device to determine a new noise threshold.

9. A non-transitory computer-readable storage medium comprising programming instructions which, when executed by a processor, to cause the processor to:
    track sound, detected by a microphone of a computing device, over a period of time;
    based on the sound tracked over the period of time, determine a noise threshold, wherein the noise threshold varies based on a time of day;
    tune a sensitivity of the microphone to wake the computing device when ambient noise, detected by the microphone, is to have a signal strength equal to or exceeding the noise threshold;
    record events when the computing device exits a sleep mode via the use of peripherals rather than the microphone detecting ambient noise exceeding the noise threshold; and
    determine the noise threshold is inaccurate when a number of the events recorded exceeds a specified value.

10. The non-transitory computer-readable storage medium of claim 9, further comprising programming instructions to cause the processor to, in response to a determination that the noise threshold is inaccurate, lower the noise threshold to make the microphone more sensitive to wake the computing device when ambient noise equals or exceeds the lower noise threshold.

11. The non-transitory computer-readable storage medium of claim 10, wherein after lowering the noise threshold several times, in response to a determination that the computing device continues to exit the sleep mode via the use of peripherals rather than the microphone detecting ambient noise, further comprising programming instructions to cause the processor to calibrate the computing device to determine a new noise threshold.

12. A computing device comprising:
    a microphone; and
    a processor to:
        track sound, detected by the microphone, over a period of time;
        based on the sound tracked over the period of time, determine a noise threshold;
        tune a sensitivity of the microphone to wake the computing device when ambient noise, detected by the microphone, has a signal strength equal to or exceeding the noise threshold;
        record events when the computing device exits a sleep mode via the use of peripherals rather than the microphone detecting ambient noise exceeding the noise threshold; and
        determine the noise threshold is inaccurate when a number of the events recorded exceeds a specified value.

13. The computing device of claim 12, wherein the noise threshold varies based on a time of day.

* * * * *